(12) United States Patent
Kanazawa et al.

(10) Patent No.: US 6,879,071 B2
(45) Date of Patent: Apr. 12, 2005

(54) SEALED MOTOR

(75) Inventors: Akio Kanazawa, Miyota-Machi (JP); Hirotaka Ichimura, Miyota-Machi (JP)

(73) Assignee: Minebea Co., Ltd., Miyota-Machi (JP)

( * ) Notice: Subject to any disclaimer, the term of this patent is extended or adjusted under 35 U.S.C. 154(b) by 0 days.

(21) Appl. No.: 10/452,602

(22) Filed: May 30, 2003

(65) Prior Publication Data
US 2004/0036369 A1 Feb. 26, 2004

(30) Foreign Application Priority Data
May 30, 2002 (JP) ........................................ 2002-157431

(51) Int. Cl.[7] ........................... H02K 5/12; H02K 5/00; H02K 5/16; H02K 7/08
(52) U.S. Cl. ............................ 310/71; 310/90; 310/89; 310/88
(58) Field of Search .............................. 310/71, 88–90

(56) References Cited

U.S. PATENT DOCUMENTS

| | | | | |
|---|---|---|---|---|
| 3,645,358 A | * | 2/1972 | Kubota et al. | 181/211 |
| 3,839,093 A | * | 10/1974 | Twogood et al. | 429/185 |
| 4,393,319 A | | 7/1983 | Bock | 310/80 |
| 4,723,754 A | | 2/1988 | Torimoto et al. | 251/129.05 |
| 4,751,411 A | | 6/1988 | Fukaya et al. | 310/49 R |
| 4,764,696 A | | 8/1988 | Fukaya et al. | 310/49 R |
| 4,866,317 A | * | 9/1989 | Katayama | 310/89 |
| 5,006,742 A | * | 4/1991 | Strobl et al. | 310/88 |
| 5,184,039 A | * | 2/1993 | Kraft | 310/89 |
| 5,247,216 A | | 9/1993 | Bosman et al. | 310/49 R |
| 5,291,087 A | * | 3/1994 | Pollick et al. | 310/86 |
| 6,672,101 B2 | * | 1/2004 | Gennami et al. | 62/469 |

* cited by examiner

*Primary Examiner*—Darren Schuberg
*Assistant Examiner*—J. Aguirrechea
(74) *Attorney, Agent, or Firm*—Schulte Roth & Zabel LLP; Joel E. Lutzker; Mayankkumar Dixit

(57) ABSTRACT

A motor having a stator and a rotor housed in a U-shaped cylindrical case. The cylindrical case has a connector bushing fitted at one end, and an opening at the other. Located on the periphery of the opening is a cylindrical support that projects inside the cylindrical case. A ball bearing is fitted inside the cylindrical support. A shaft is inserted into the opening and one end of the shaft is supported in the bearing. The other end of the shaft is supported in another bearing, which in turn, is mounted in a bearing bushing housed in the cylindrical case. One end of the stator touches a step of the inner circumference of the case, thereby fixing the position of the stator in the axial direction. One end of the inner circumference of the stator is fitted to an outer circumference of the cylindrical support, thereby fixing its position in the radial direction. Two rotor cores are mounted on the shaft. The gap between the stator core and the rotor cores is approximately 40–50 microns. The connector is integrated with the connected bushing.

14 Claims, 3 Drawing Sheets

// SEALED MOTOR

CROSS-REFERENCE TO RELATED APPLICATIONS

This application claims priority from the commonly-assigned Japanese Patent Application No 2002-157431 filed on May 30, 2002 and entitled "MOTOR".

BACKGROUND OF THE INVENTION

The present invention relates to motors, more particularly to compact motors having a sealed structure suitable for installation in an engine room of an automobile.

DESCRIPTION OF PRIOR ART

A stepping motor may be installed in an automobile engine room, for example, to control intake or exhaust function of an automobile engine. Such stepping motor must withstand severe environment including high temperature, low temperature, dust, moisture and oil. The stepping motor has to be compact and at the same time be precise. The prior art motors try to meet the above mentioned demands by having a sealed structure and locating a connector for making electrical connections on a side surface of the case of the motor. The demand for low-emission and fuel-efficient vehicles increases the use of instruments such as engine control devices. These devices are increasingly more complex and high-level. Therefore, there is a need for a motor that is compact, precise, suitable for operation in severe environment and cost effective to manufacture.

SUMMARY OF THE INVENTION

The present invention overcomes the shortcomings of the prior art and provides a compact, sealed and highly precise motor which can be assembled easily.

The stepping motor described herein has a stator and a rotor housed in a U-shaped cylindrical case. The cylindrical case has a connector bushing filled at one end. The other end of the cylindrical case has an opening. Located on the periphery of the opening is a cylindrical support (the first spigot) that projects inside the cylindrical case. A ball bearing is filled inside the cylindrical support. A shaft is inserted in the opening and one end of the shaft is supported in the bearing. The other end of the shaft is supported in another bearing, which in turn, is mounted in a bearing bushing (the second spigot) housed in the cylindrical case.

The stator includes a stator core having a circular shape. The stator core has a fixed number of magnetic poles distributed around its inner circumference. Coil bobbins made from an insulating material such as composite plastic are mounted on each magnetic pole. A coil is wound through the coil bobbins on each magnetic pole. Intermediary terminals are placed on the coil bobbins. The coil ends are connected to the intermediary terminals. This results in each terminal being connected to a coil end.

The stator is inserted into the case. One end of the stator touches a step of the inner circumference of the case, thereby fixing the position of stator in the axial direction. Also, one end of the inner circumference of the stator is fitted to an outer circumference of the support, thereby fixing its position in the radial direction.

The rotor includes at least two rotor cores. The rotor cores are mounted on the shaft. The gap between the stator core and the rotor cores is approximately 40–50 µm.

The connector bushing has a large tubular end and a small tubular end. The small tubular end includes a tubular connector having an approximately rectangular cross-section. By making the connector an integral part of the connector bushing the size of the stepping motor is reduced.

In a second embodiment, a bearing bushing, which supports a ball bearing, is made integral with a connector bushing. Thus, the second embodiment has fewer components.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
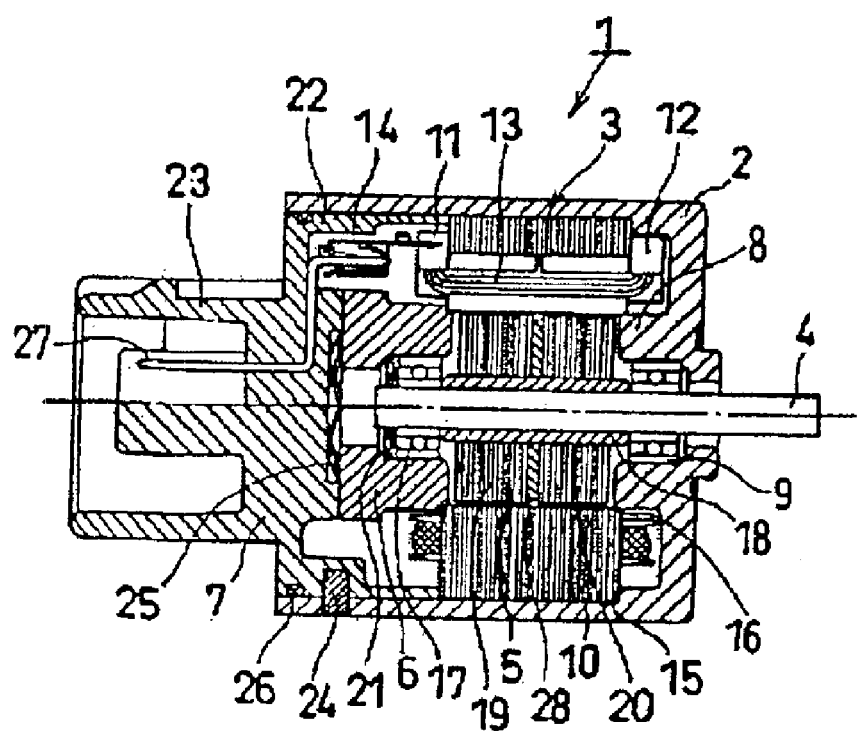
FIG. 1 shows a vertical cross-sectional view along line A—A of FIG. 2.
Figure 3:
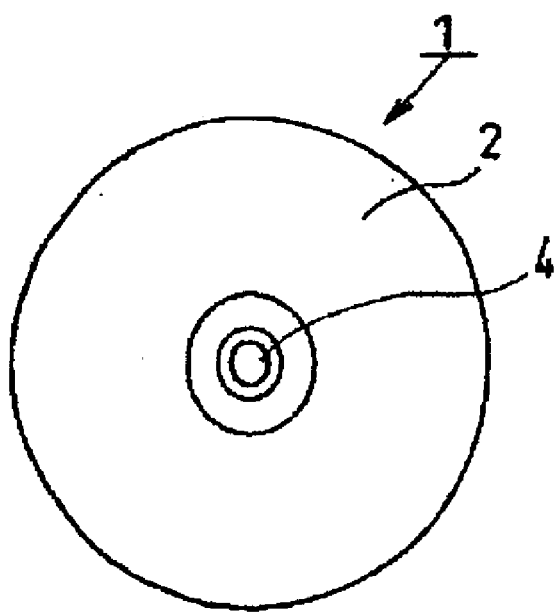
FIG. 3 is an end view of the shaft side of the stepping motor shown in FIG. 1.

FIG. 1 shows a stepping motor 1 having a stator 3 and a rotor 5 housed in a U-shaped cylindrical case 2. The cylindrical case 2 has a connector bushing 7 fitted at one end. The other end of the cylindrical case 2 has an opening. Located on the periphery of the opening is a cylindrical support 8 (the first spigot) that projects inside the cylindrical case 2. A ball bearing 9 is fitted inside the cylindrical support 8. A shaft 4 is inserted into the opening and one end of the shaft 4 is supported in the bearing 9. The other end of the shaft 4 is supported in a bearing 17, which, in turn, is mounted in a bearing bushing 6 (the second spigot) housed in the cylindrical case 2. The cylindrical case 2 is made from a non-magnetic material such as diecast aluminum. FIG. 3 is an end view of the stepping motor 1 showing the shaft 4 and the cylindrical case 2.

The stator 3 includes a stator core 10 having a cylindrical shape and made by layering thin plates of magnetic material. The stator core 10 has a fixed number of magnetic poles distributed around its inner circumference. The magnetic poles project in a radial direction. A fixed number of teeth are formed on the end of each magnetic pole. The teeth are formed along the perimeter of stator core 10 and have a fixed pitch. Coil bobbins 11 and 12 made from an insulating material such as composite plastic are mounted on each magnetic pole. A coil 13 is wound through the coil bobbins 11 and 12 on each magnetic pole. Intermediary terminals 14 are placed on coil bobbins 11. The intermediary terminals 14 extend in axial direction. The coil 13, wound on each magnetic pole, connects to the intermediary terminal 14 in accordance with each corresponding excitation phase.

The stator 3 is inserted into the case 2. One end of the stator 3 touches a step 15 formed on the inner circumference of the case 2, thereby fixing the position of stator 3 in the axial direction. Also, one end of the inner circumference of the stator 3 is fitted to an outer circumference 16 of the support 8, thereby fixing its position in the radial direction.

The rotor 5 includes rotor cores 19 and 20. The rotor cores 19 and 20 are mounted on a bush 18 which in turn is mounted on the shaft 4. A ring magnet 28 is sandwiched between the rotor cores 19 and 20. A fixed number of teeth are formed on the outer circumference of rotor cores 19 and 20. The teeth on rotor cores 19 and 20 have same pitch as the teeth on stator 3 magnetic poles and are located opposite the teeth on stator 3 magnetic poles. The teeth on rotor cores 19 and 20 are offset from each other by half a pitch. The gap between the stator core 10 and rotor cores 19 and 20 is approximately 40–50 μm.

The bearing bushing 6 is an approximately cylindrical component having the bearing 17 mounted in it. The shaft 4 is supported in the bearing 17. A spring shim 21 is placed between the end of the shaft 4 and the annular wall of bearing bushing 6. The spring shim 21 pre-loads the bearing 17. The bearing bushing 6 has a step formed on its outer circumference at the end that is towards the stator core 10. The end of the stator core 10 and its inner circumference contact the step formed in the bearing bushing 6, thereby, locating the bearing bushing 6 in the axial and radial direction. The bearing bushing 6 may be formed of material such as diecast aluminum or composite plastic.

Figure 2:
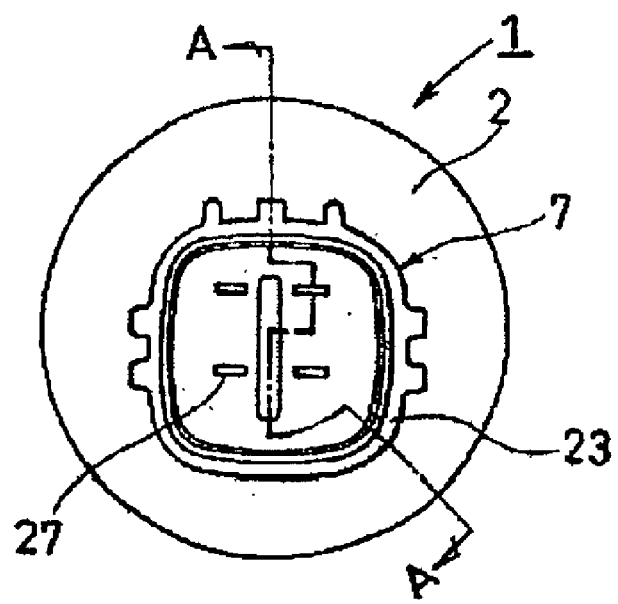
FIG. 2 is an end view of the connector side of the stepping motor shown in FIG. 1.

FIG. 2 is an end view of the stepping motor 1 showing the connector bushing 7. The connector bushing 7 has a large tubular end and a small tubular end. The large tubular end includes a circular tube 22 (FIG. 1) having a bottom. The circular tube 22 is fitted to the cylindrical case 2 using a pin 24. The end of the circular tube 22 touches the end of stator core 10 and thus positions the stator 3. The bottom of the circular tube 22 touches the bearing bushing 6 and thereby positions the bearing bushing 6 in axial direction. A spring shim 25 is placed between the bearing bushing 6 and the connector bushing 7. The space between the cylindrical case 2 and the connector bushing 7 is sealed by an O-ring 26. Thus, the interior of the cylindrical case 2 is sealed against intrusion of contaminants such as dust and moisture. The small tubular end includes a tubular connector 23 having an approximately rectangular cross-section. By making the connector 23 an integral part of the connector bushing 7 the size of the stepping motor 1 is reduced. The connector bushing 7 may be made from material such as composite plastic.

The connector bushing 7 includes a fixed number (four shown in FIG. 2) of connector pins 27. The connector pins 27 pierce through the bottom portion and have one end projecting in the circular tube 22 and the other end projecting in the tubular connector 23. The ends of the connector pins 27 that project into the circular tube 22 are arranged facing a stator 3 intermediary terminal 14. Thus, when the circular tube 22 is fitted into the cylindrical case 2, the ends of the connector pins 27 match with the intermediary terminal 14. The connector pins 27 may be attached after the formation of the main body of the connector bushing 7, or they may be inserted during formation of the main body of the connector bushing 7, i.e., the connector pins 27 may be insert molded in the connector bushing 7.

A device that may be driven by the stepping motor 1 may be mounted on the cylindrical case 2 at the end opposite to the connector end of the stepping motor 1. The space between the cylindrical case 2 and the shaft 4 will be sealed by the device that is mounted on the cylindrical case 2. Alternatively, a seal may be established between the shaft 4 and the cylindrical case 2 by a method such as use of an O-ring.

Figure 4:
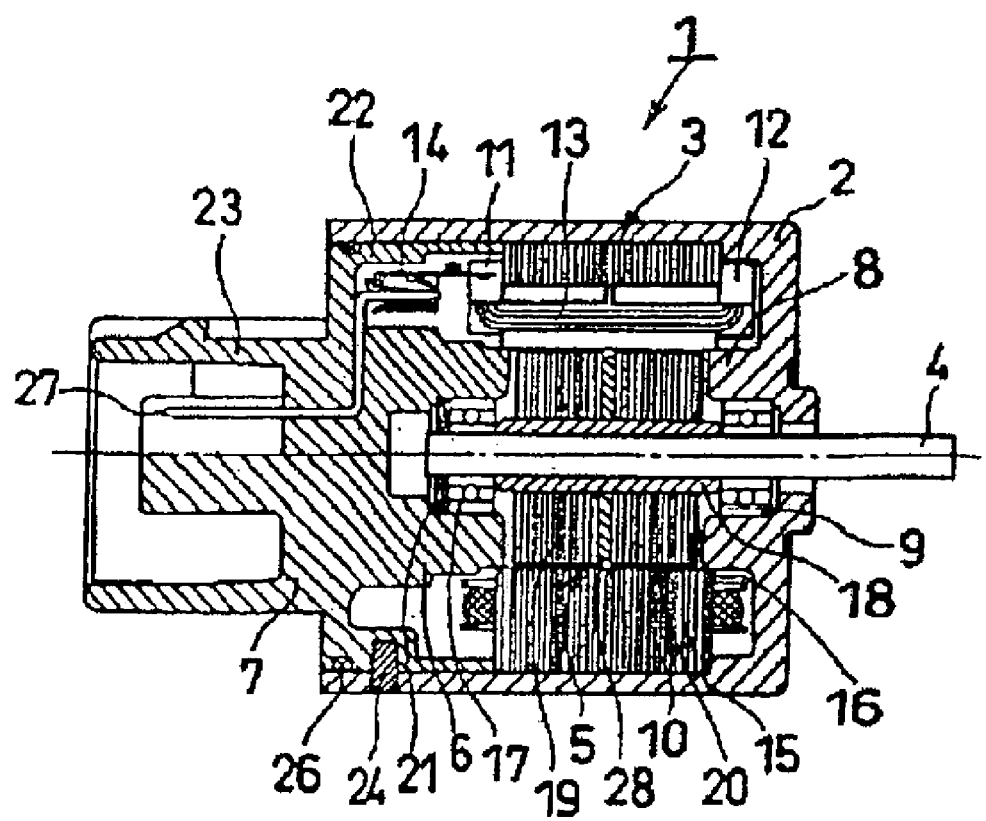
FIG. 4 is a vertical cross-sectional view, similar to FIG. 1, of the stepping motor of the second embodiment.

In a second embodiment shown in FIG. 4, a bearing bushing 6, which supports a ball bearing 17, is integral with a connector bushing 7. In this embodiment the spring shim 25 is not used and the outer circumference of the end of the bearing bushing 6 that is towards a stator core 10 does not touch the end surface of the stator coil 10. Other details of the second embodiment are similar to those described in reference to the first embodiment. Thus, the second embodiment has fewer components.

In use, for example, the wiring harness (not shown) of the automobile is connected to the connector 23. When electricity is conducted through the connector pin 27 to the stator coil 13, the magnetic poles of stator 3 are excited. By consecutively switching excitation phase, the rotor 5 and shaft 4 are rotated in steps equal to the pitch of the teeth on the rotor.

The stepping motor 1 is assembled as follows: The ball bearing 9 is inserted into the cylindrical case 2. The stator 3 and the rotor 5 are also inserted into the cylindrical case 2. Next, the bearing bushing 6 with the ball bearing 17 is inserted into the cylindrical case 2. The ball bearing 17 supports the shaft 4. The spring shim 21 is placed between the ball bearing 17 and the bearing bushing 6. Next, the spring shim 25 and the O-ring 26 are placed into the connector bushing 7 and the assembly of the connector bushing 7, the spring shim 25 and O-ring 26 is assembled with cylindrical case 2. When the connector bushing 7 is assembled, the connector pins 27 are matched to the stator 3 intermediary terminals 14. Next, the connector bushing 7 is fixed in position by pins 24.

During the assembly of the second embodiment, when fitting the connector bushing 7 to the cylindrical case 2, it is necessary to match the positions of circular tube 22 with the cylindrical case 2 and match the position of bearing bushing 6 with the stator core 10, and the ball bearing 17 with the shaft 4.

In the assembled state, the ball bearings 9 and 17 support the rotor 5 and the shaft 4 of the stepping motor 1. The inner circumference of stator core 10 is fixed into position in the radial direction by the supporter 8 and bearing bushing 6 (the second spigot) resulting in precise positioning of the stator core 10. The precise positioning of the stator core 10 allows reduction in the size of gap between the rotor 5 and the stator 3 which in turn improves the stopping precision of the stepping motor 1. The precision of the stepping motor 1 is further improved by setting the axial position of rotor 5. The precision of the stepping motor 1 is also improved by setting the position of stator 3 by pre-loading the ball bearings 9 and 17 and bearing bushing 6 using the spring shims 21 and 25. Alternatively, the stator core 10 can be fixed in the radial direction by fitting it to the inner circumference of cylindrical case 2.

Although the invention is described using stepping motor as an example, the invention can be applied to other types of motors. For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A motor comprising:
   a U-shaped cylindrical case having a first end and a second end, the second end having a bottom;
   a stator mounted in the U-shaped cylindrical case;
   a rotor having a first core and a second core mounted in the U-shaped cylindrical case;
   an intermediary terminal mounted in the stator, the intermediary terminal being located near the first end of the U-shaped cylindrical case;
   a coil connected to the intermediary terminal;
   a connector bushing fitted in the first end of the U-shaped cylindrical case;
   a first spigot formed at the second end of the U-shaped cylindrical case;
   a second spigot located near the first end of the U-shaped cylindrical case, the second spigot being fixed in place by a contact between the second spigot and the connector bushing; and
   at least one connector pin molded with the connector bushing to form an integral component, wherein,
      the electrical connection between the connector pin and the intermediary terminal is completed when the connector bushing is inserted into the U-shaped cylindrical case.

2. The motor of claim 1, wherein the space between the connector bushing and the U-shaped cylindrical case is sealed to prevent ingress of contaminants.

3. The motor of claim 1, further comprising:
   a first bearing mounted in the first spigot;
   a second bearing mounted in the second spigot; and
   a shaft supported in the first and the second bearing; wherein
   the rotor is mounted on the shaft, and wherein,
   the axial position of the stator is fixed by a contact between the stator and the connector bushing.

4. The motor of claim 3, wherein the radial position of the stator is fixed by a contact between the stator and an outer circumference of the first spigot.

5. The motor of claim 4, wherein a radial distance between the stator and the rotor is between 40 microns and 50 microns.

6. A motor comprising:
   a U-shaped cylindrical case having a first end and a second end, the second end having a bottom;
   a stator mounted in the U-shaped cylindrical case;
   a rotor having a first core and a second core mounted in the U-shaped cylindrical case;
   an intermediary terminal mounted in the stator, the intermediary terminal being located near the first end of the U-shaped cylindrical case;
   a coil connected to the intermediary terminal;
   a connector bushing fitted in the first end of the U-shaped cylindrical case;
   a first spigot formed at the second end of the U-shaped cylindrical case;
   a second spigot located near the first end of the case, the second spigot being integral with the connector bushing;
   a first bearing mounted in the first spigot;
   a second bearing mounted in the second spigot and
   a shaft supported in the first and the second bearing; wherein
   the rotor is mounted on the shaft, and wherein the axial position of the stator is fixed by a contact between the stator and the connector bushing; and
   at least one connector pin molded with the connector bushing to form an integral component, wherein,
   the electrical connection between the connector pin and the intermediary terminal is completed when the connector bushing is inserted into the U-shaped cylindrical case.

7. The motor of claim 6, wherein the radial position of the stator is fixed by a contact between the stator and an outer circumference of the first spigot.

8. The motor of claim 7, wherein the radial distance between the stator and the rotor is between 40 microns and 50 microns.

9. A motor comprising:
   a case having a first end and a second end;
   a stator mounted in the case;
   a rotor mounted in the case;
   an intermediary terminal mounted in the stator, the intermediary terminal being located near the first end of the case;
   a coil connected to the stator and the intermediary terminal;
   a connector bushing fitted in the first end of the case;
   at least one connector pin mounted in the connector bushing, the connector pin making an electrical contact with the intermediary terminal;
   a first spigot located at the second end of the case;
   a second spigot located near the first end of the case, the second spigot being fixed in place by a contact between the second spigot and the connector bushing;
   a first bearing mounted in the first spigot;
   a second bearing mounted in the second spigot; and
   a shaft supported in the first and the second bearing; wherein the rotor is mounted on the shaft, and wherein, the axial position of the stator is fixed by a contact between the stator and the connector bushing.

10. The motor of claim 9, wherein the radial position of the stator is fixed by a contact between the stator and an outer circumference of the first spigot.

11. The motor of claim 10, wherein a radial distance between the stator and the rotor is between 40 microns and 50 microns.

12. A motor comprising;
   a case having a first end and a second end;
   a stator mounted in the case;
   a rotor mounted in the case;
   an intermediary terminal mounted in the stator, the intermediary terminal being located near the first end of the case;
   a coil connected to the intermediary terminal;
   a connector bushing fitted in the first end of the case;
   at least one connector pin mounted in the connector bushing, the connector pin making an electrical contact with the intermediary terminal;
   a second spigot located near the first end of the case, the second spigot being integral with the connector bushing
   a first spigot located at the second end of the case;
   a first bearing mounted in the first spigot;
   a second bearing mounted in the second spigot; and
   a shaft supported in the first and the second bearing; wherein the rotor is mounted on the shaft, and wherein the axial position of the stator is fixed by a contact between the stator and the connector bushing.

13. The motor of claim 12, wherein the radial position of the stator is fixed by a contact between the stator and an outer circumference of the first spigot.

14. The motor of claim 13, wherein the radial distance between the stator and the rotor is between 40 microns and 50 microns.

* * * * *